United States Patent [19]
Marans

[11] Patent Number: 5,820,029
[45] Date of Patent: Oct. 13, 1998

[54] DRIP IRRIGATION EMITTER

[75] Inventor: Elaine Marans, Pasadena, Calif.

[73] Assignee: Rain Bird Sprinkler, Mfg. Corp., Glendale, Calif.

[21] Appl. No.: 811,388

[22] Filed: Mar. 4, 1997

[51] Int. Cl.$^6$ .................................................. B05B 15/00
[52] U.S. Cl. ............................................................ 239/542
[58] Field of Search ............................ 239/542, 533.13, 239/547

[56] References Cited

U.S. PATENT DOCUMENTS

| 3,998,391 | 12/1976 | Lemelshtrich | 239/542 |
|---|---|---|---|
| 4,161,291 | 7/1979 | Bentley | 239/542 |
| 4,344,576 | 8/1982 | Smith | 239/542 |

FOREIGN PATENT DOCUMENTS

| 493299 | 7/1992 | European Pat. Off. | 239/542 |
|---|---|---|---|
| 2366790 | 5/1978 | France | 239/542 |

*Primary Examiner*—Kevin Weldon
*Attorney, Agent, or Firm*—Kelly Bauersfeld; Lowry & Kelley, LLP.

[57] ABSTRACT

An improved drip irrigation emitter is provided for low volume supply of water at a trickle or drip flow rate. The emitter comprises a housing adapted for connection to a water supply hose, and includes a water inlet and a water outlet with an elongated pressure reducing flow channel extending therebetween. The flow channel is lined on opposite sides by a plurality of flow diverting ribs which project laterally and partially into the flow channel in a staggered or alternating pattern, in combination with a plurality of flow diverting weirs which project upwardly and partially into the flow channel from a floor thereof. The flow diverting ribs and weirs define a three dimensional tortuous flow path for repeated back-and-forth and up-and-down directional flow change as water travels therethrough, resulting in an improved pressure drop between the water inlet and outlet.

20 Claims, 3 Drawing Sheets

DRIP IRRIGATION EMITTER

BACKGROUND OF THE INVENTION

This invention relates generally to irrigation emitter devices for delivering a flow of irrigation water at a substantially trickle or drip flow rate. More specifically, this invention relates to an improved trickle or drip-type irrigation device for providing a predetermined low volume water output while reducing or minimizing risk of clogging by grit and the like.

Drip irrigation emitters are generally known in the art for use in delivering irrigation water to a precise point at a predetermined and relatively low volume flow rate which typically can be on the order of ½ gallon per hour up to about 24 gallons per hour. Such irrigation devices typically comprise an emitter housing connected to a water supply hose through which irrigation water is supplied under pressure. The drip irrigation device taps a portion of the relatively high pressure irrigation water from the supply hose for flow through a typically long or small cross section flow path to achieve a desired pressure drop prior to discharge at a target trickle or drip flow rate. In a conventional system, a large number of the drip irrigation devices are mounted at selected positions along the length of the supply hose to deliver the irrigation water to a large number of specific points, such as directly to a plurality of individual plants. In many designs, the drip irrigation device includes pressure compensation means for providing a predetermined and substantially constant discharge flow notwithstanding fluctuations in the supply hose water pressure. In addition, many drip irrigation devices are adapted to permit a relatively high albeit short term flush flow of water therethrough when the water supply system is turned on or off, to flush grit and other contaminants that could otherwise clog the device.

While drip irrigation devices of the general type described above have been provided in many different geometric configurations with varying degrees of operational success, there exists a continuing need for further improvements to such irrigation devices, particularly with respect to a compact and cost-efficient product having an improved pressure drop with minimal or reduced risk of failure due to clogging. The present invention is specifically directed to an improved drip irrigation device which provides these benefits and further related advantages.

SUMMARY OF THE INVENTION

In accordance with the invention, an improved drip irrigation emitter is provided with a pressure reducing flow channel of relatively large cross-sectional size formed to define a three dimensional tortuous path shape producing improved or higher pressure drop over a relatively short distance and reduced risk of clogging during operation. Herein, the emitter comprises a compact housing adapted for connection to a water supply hose carrying a supply of water under pressure, and which defines a water inlet for tapping a portion of the water flow from the supply hose, and directing the flow to and through the three dimensional tortuous path flow channel for subsequent discharge to a desired location through a water outlet.

In the preferred form, the emitter housing comprises a generally cup-shaped housing base defining a floor with an upstanding peripheral outer wall, with the flow channel formed in part as a shallow upwardly open channel pattern in the floor of the housing base. A disk-shaped elastomeric valve member is fitted into the housing base to overlie the channel pattern, and a housing cap is secured to the housing base to close the open end thereof. The housing cap includes an inlet fitting and related water inlet for connection to the water supply hose, and the water outlet is formed in the floor of the housing base. In operation, a portion of the water within the supply hose is tapped for flow to and through the flow channel, with accompanying pressure reduction, prior to discharge through the water outlet. The water pressure within the supply hose is communicated through the inlet to force the valve member against the channel pattern, whereby the valve member and channel pattern cooperatively define the pressure reducing flow channel.

The channel pattern includes a spaced-apart pair of short side walls to form the elongated flow channel with an upstream end in flow communication with the water inlet, and a downstream end in flow communication with the water outlet. The side walls include a plurality of flow diverting ribs which extend partially into the flow channel in a staggered or alternating pattern to cause the water to flow back-and-forth in a direction-changing manner. In addition, the floor of the housing base includes a plurality of short flow diverting weirs which extend partially into the flow channel to cause the water to flow up-and-down in a direction-changing manner. The combined flow diverting ribs and weirs result in the three dimensional tortuous path flow channel wherein the water flow directionally changes back-and-forth and up-and-down as it flows to the water outlet, resulting in a substantial pressure drop for trickle or drip flow discharge through the outlet. By virtue of the three dimensional tortuous flow path, the flow path has a relatively larger cross-sectional size than heretofore possible thereby reducing the risk of clogging, yet provides improved or higher pressure drop over a shorter distance.

These and other features of the invention will become more apparent from the following detailed description, taken in conjunction with the accompanying drawings which illustrate, by way of example, the principles of the invention.

BRIEF DESCRIPTION OF THE DRAWINGS

The accompanying drawings illustrate the best mode presently contemplated for carrying out the principles of the invention. In such drawings.

DETAILED DESCRIPTION OF THE PREFERRED EMBODIMENT

Figure 1:
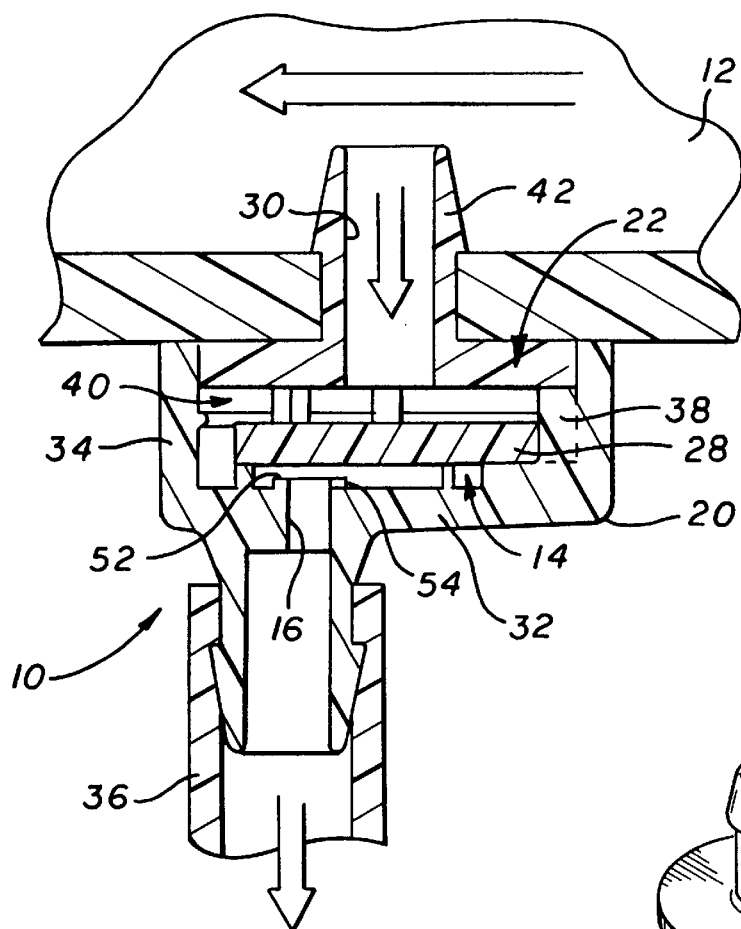
FIG. 1 is a fragmented vertical sectional view of a drip irrigation emitter constructed in accordance with the invention, shown mounted to a water supply hose.

As shown in the exemplary drawings, an improved drip irrigation emitter referred to generally in FIG. 1 by the reference numeral 10 is provided for delivering irrigation water from a water supply conduit such as a hose 12 at a low volume, substantially trickle or drip flow rate. The emitter 10 of the present invention includes a tortuous path flow channel 14 of a three dimensional configuration, to result in an improved and overall greater pressure reduction between the supply hose 12 and a discharge outlet 16, with reduced or minimal risk of clogging failure.

The emitter 10 comprises a compact housing which can be conveniently and economically formed from assembled plastic molded housing components. The housing includes a generally cup-shaped base 20 (FIGS. 1 and 2) adapted for assembly with a cap 22 to form a substantially enclosed housing interior. In general terms, the flow channel 14 is defined by a channel pattern 26 (FIG. 2) formed in the base 20, in cooperative relation with a resilient and flexible elastomeric valve member 28. Water is supplied to the flow channel 14 via a water inlet 30 formed by the cap 22, and water is discharged from the flow channel through the discharge outlet 16 formed in the base 20. The geometry of the channel pattern 26 cooperates with the valve member 28 to define the three dimensional flow channel 14 for improved pressure drop between the inlet 30 and the outlet 16.

Figure 2:
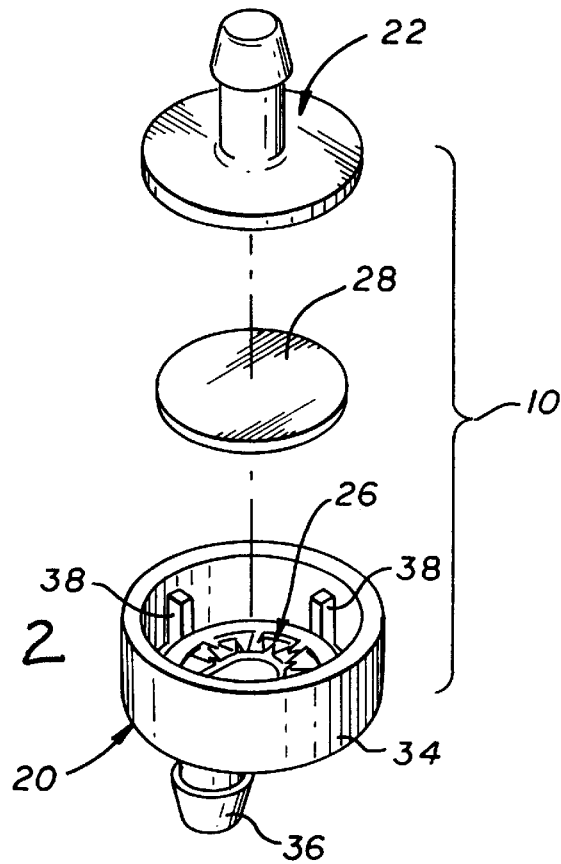
FIG. 2 is an exploded perspective view of the drip irrigation emitter of FIG. 1.
Figure 3:
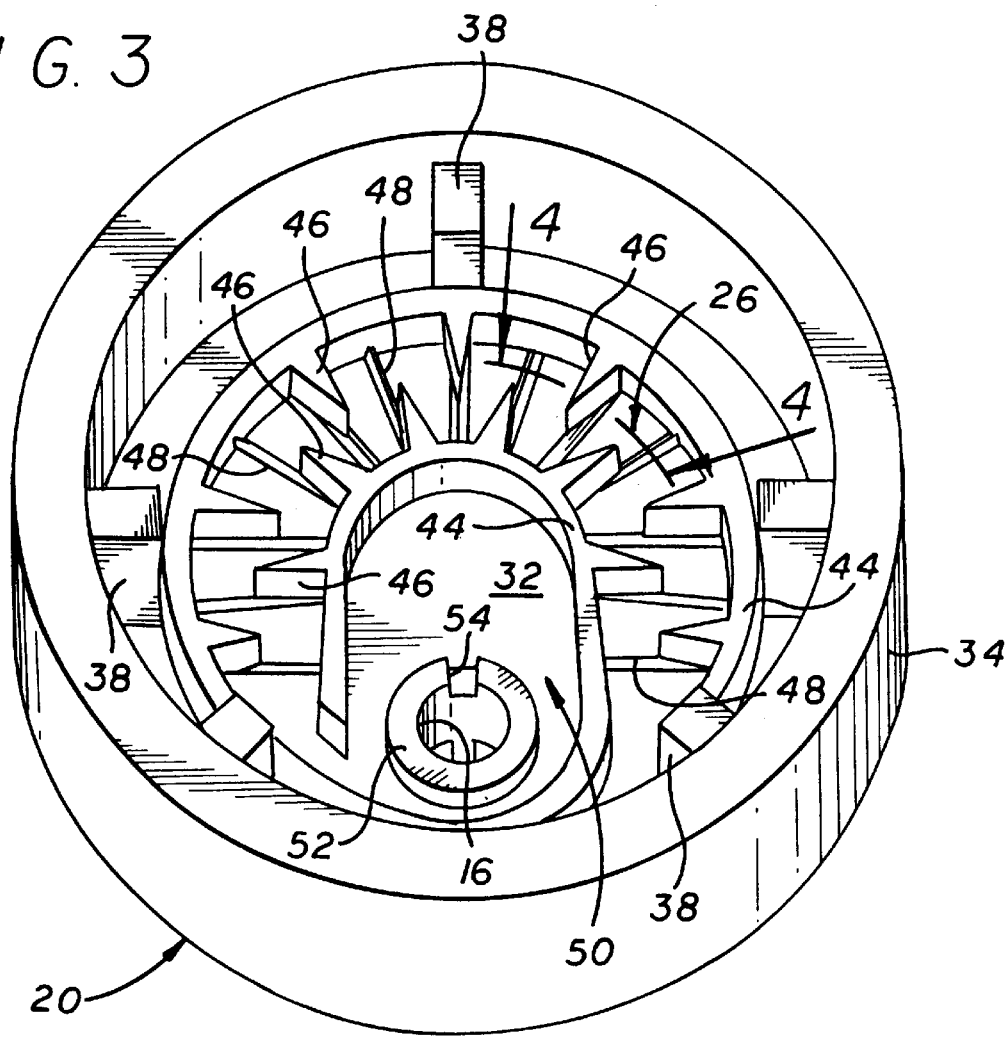
FIG. 3 is an enlarged perspective view showing internal construction details of a housing base for the emitter of FIG. 2.

More specifically, as shown in FIGS. 1 -3, the housing base 20 herein has an upwardly open, generally cup-shaped construction including a circular bottom or floor surface 32 joined at the perimeter thereof to a cylindrical upstanding outer wall 34. The channel pattern 26 is formed on the floor 32 with a generally circular configuration arranged about the outlet 16 which may include a short downwardly projecting hollow stem 36 for press-fit attachment to discharge tubing (not shown), if desired. A plurality of spacer posts 38 are also formed on the base 20 to project upwardly from the floor 32 at the floor perimeter and terminate with upper ends disposed above the channel pattern 26, but below the upper edge of the outer wall 32.

The valve member 28 comprises a resilient disk having a size and shape to fit into the housing base 20, with an outer margin of the valve member 28 fitting within the spacer posts 38. The housing cap 22 is then assembled with the base 20 by press-fit mounting of the disk-shaped cap into the open end of the base, to seat the cap 22 against the upper ends of the spacer posts 38. The cap 22 can be securely connected to the base 20 in a sealed manner by use of a suitable adhesive, or by ultrasonic welding or the like. When assembled, the housing base 20 and cap 22 defined an inlet chamber 40 (FIG. 1) within which the valve member 28 is retained with at least some floating movement in a position aligned over the channel pattern 26. The water inlet 30 is formed in the cap 22 and is typically associated with an inlet stem 42 which may include a barbed construction for press-on puncture type attachment to the water supply hose 12.

As shown best in FIG. 3, the channel pattern 26 is defined by a pair of relatively short upstanding and laterally spaced-apart sides 44. To fit within the desired compact package, these sides 44 extend with a substantially uniform lateral spacing through a generally curved geometry between an outer inlet or upstream end disposed at the perimeter of the floor 32 between a pair of the spacer posts 38, and a downstream end in flow communication with a generally centered discharge chamber 50 which leads in turn to the water outlet 16. The floor 32 extending between the laterally spaced opposed portions of the sides 44 form the bottom or lower wall of the flow channel 14. The resilient valve member 28 is forced by the pressure of water within the supply hose 12 and communicated to the inlet chamber 40 to seat against the upper edges of the two sides 44. Accordingly, during normal operation, the valve member 28 engages the sides 44 of the channel pattern 26 and thus cooperates therewith to form the upper wall boundary of the flow channel 14.

In accordance with the present invention, the flow channel 14 includes surface structures formed as part of the channel pattern 26 to define the three dimensional tortuous flow path. More particularly, a plurality of flow diverting ribs or teeth 46 are formed to extend from both sides 44 partially into the flow channel 14, wherein these ribs 46 are arranged in a staggered or alternating fashion. In the preferred form, each flow diverting rib 46 has a length to extend laterally approximately to a centerline of the flow channel, whereby the ribs 46 obstruct direct flow-through passage of the water. Instead, the ribs 46 force the water to flow in a direction-changing laterally back-and-forth manner, with resultant velocity reduction and turbulence to achieve a substantial pressure reduction. Importantly, the flow diverting ribs 46 do not significantly reduce the cross-sectional flow area of the channel, wherein such channel restrictions could undesirably increase the likelihood of clogging due to accumulation of grit and other particulate contaminants.

Figure 4:
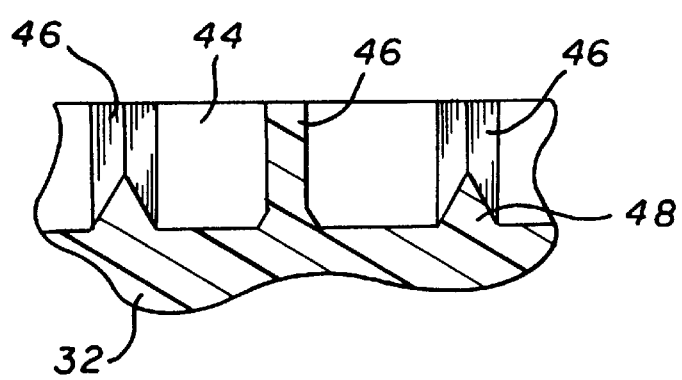
FIG. 4 is an enlarged fragmented vertical sectional view taken generally on the line 4—4 of FIG. 3.

In accordance with a primary aspect of the invention, the channel pattern 26 additionally includes a plurality of flow diverting surfaces, herein upwardly projecting weirs 48 formed on the lower wall or floor 32 of the housing base 20, and which project into the flow channel 14 to cause the water flowing through the channel to be deflected vertically, thereby imparting an up-and-down directional change to the flow. As shown in FIGS. 3 and 4, the weirs 48 herein are disposed at regular intervals along the channel length, to extend laterally across and to project into the flow path in an orientation generally perpendicular to the ribs 46. The weirs 48 are preferably provided in a number corresponding generally with the number of the flow diverting ribs 46, with the weirs 48 being shown aligned with the individual ribs 46 in the embodiment of FIGS. 3 and 4. The height of the weirs 48 preferably are sufficient to extend about one-third up to about one-half of the height of the flow channel 14. The weirs 48 function to force the water to flow in a direction-changing up-and-down manner, again with resultant velocity reduction and related turbulence to achieve a further and substantial pressure loss. The combined effects of the flow diverting ribs 46 and the weirs 48 create the three dimensional flow channel 14 which is of relatively large cross-sectional size and wherein the water repeatedly changes direction back-and-forth and up-and-down to result in a substantial and relatively increased pressure reduction over a relatively short channel length in a compact drip irrigation device.

From the flow channel 14, in the preferred form of the invention, the water enters the centrally located discharge chamber 50 bounded by the valve member 28 and the inner wall surface of sides 44 of the underlying channel pattern 26. This discharge chamber 50 includes a raised circular boss 52 projecting upwardly from the floor 32 of the housing base 20 to engage the valve member 28. The boss 52 has an upwardly open discharge regulating groove 54 formed therein, for discharge flow of the water from the outlet chamber 50 to the water outlet 16 of the emitter. Importantly, the effective cross sectional size of this discharge regulating groove 54 varies in accordance with the pressure of the water in the inlet chamber 40 as the resilient valve member 28 is pressure-forced partially into the groove 54 as a result of the pressure of the supply water acting on its upper surface. The emitter thus provides for pressure compensation by varying the effective size of the discharge groove 54 as a function of inlet pressure, to achieve a substantially constant discharge outlet flow over a range of typical water supply pressures. Moreover, due to the increased pressure drop created by the three dimensional flow channel pattern 26, the discharge regulating groove 54 can be of relatively large size yet still provide the desired pressure regulation function while further reducing the possibility of clogging during use.

In use, drip irrigation emitters 10 of the invention are typically attached at selected points along the length of the supply hose 12, and water is supplied to and through the supply hose at an appropriate elevated supply pressure. Each emitter 10 taps a portion of the water from the supply hose. At the moment when the water is initially turned on, the valve member 28 is normally slightly unseated from the underlying channel pattern 26 to permit a short flush flow of water substantially directly to the outlet 16, wherein this flush flow is intended to flush any accumulated grit and the like from the emitter. However, when the water is turned on, the pressure rises quickly in the inlet chamber 40 to seat the valve member 28 against the channel pattern 26 and to provide appropriate pressure compensation relative to the discharge groove 54. Thereafter, water flow through the emitter between the inlet 30 and the outlet 16 is confined to the three dimensional direction-changing flow channel 14, with substantial flow turbulence and pressure reduction to provide a trickle or drip discharge flow rate which can be less than that provided in prior emitters of comparable size.

Figure 5:
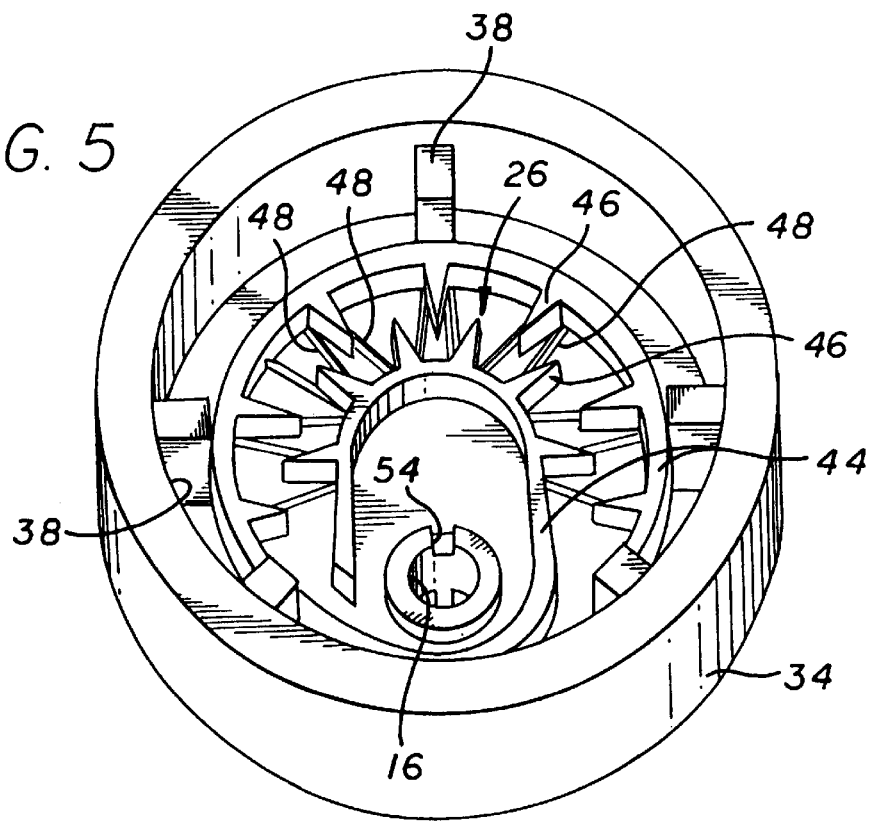
FIG. 5 is a perspective view similar to FIG. 3, but showing an alternative preferred form of a housing base for use in the invention.
Figure 6:
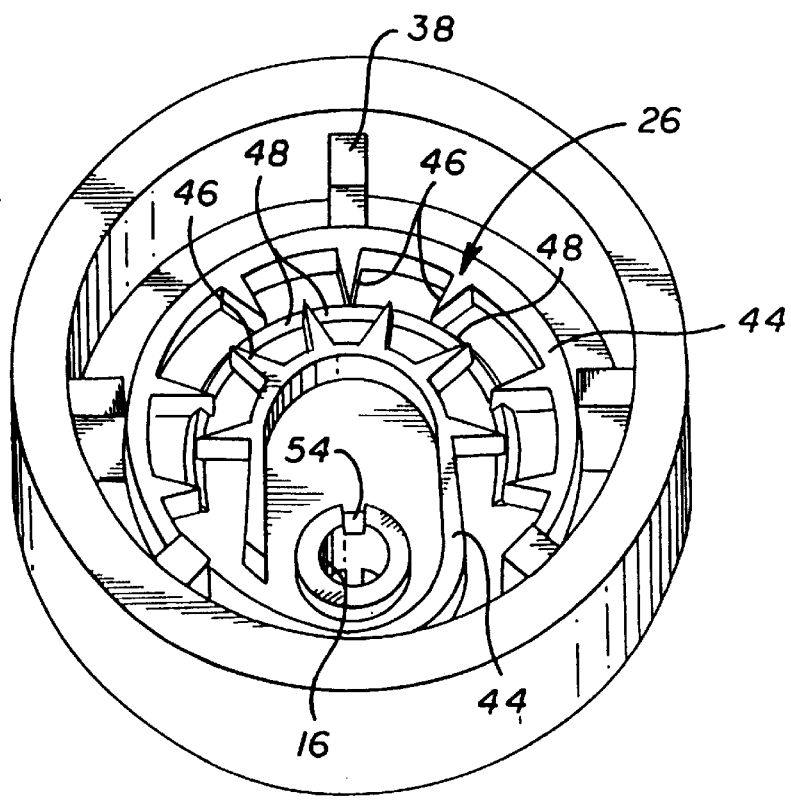
FIG. 6 is another perspective view similar to FIG. 3, and depicting still another alternative preferred form of a housing base for use in the invention.

FIGS. 5 and 6 illustrate alternative housing base geometries which may be employed to form the three dimensional flow channel 14 of the present invention. In this regard, for sake of clarity and ease of description, the alternative housing base configurations shown in FIGS. 5 and 6 are identified by common reference numerals used to identify the same or functionally equivalent structures in FIGS. 1–4. In FIG. 5, the channel pattern 26 is shown with the spaced-apart sides 44 and associated flow diverting ribs 46. The embodiment depicted in FIG. 5 is modified by forming the weirs 48 to extend laterally across the flow channel and angularly between adjacent ribs 46, so that the back-and-forth direction change associated with each of the ribs 46 is closely followed by an up-and-down direction change associated with one of the weirs 48. FIG. 6 shows a similar concept, but wherein the weirs 48 are defined by a continuous baffle extending generally along the centerline of the flow path and intersecting the tips of the flow diverting ribs 46.

From the foregoing, it should be apparent that the improved drip irrigation emitter of the present invention thus provides a compact and highly efficient emitter construction for achieving substantial pressure reduction as water flows through the three dimensional flow channel 14. The flow diverting ribs 46 cause a repeated back-and-forth directional flow change within a first plane or axis, while the flow diverting weirs 48 cause another repeated back-and-forth directional change along a second plane or axis which is generally perpendicular to the first plane. The combination of these two back-and-forth directional change motions produces a substantially increased turbulence as the water passes through the flow channel. As a result, greater pressure drops can be achieved over shorter distances with minimal risk of clogging, since the cross-sectional size of the flow channel 14 can be relatively large and the turbulent flow effectively dislodges and sweeps any grit particles from the flow path.

A variety of further modifications and improvements to the improved drip irrigation emitter of the present invention will be apparent to those skilled in the art. In this respect, it should be noted that additional weirs can be provided to project downwardly from the upper surface of the channel means by forming such weirs to extend from the lower face of the valve member 28, such additional weirs preferably being located to alternate with the weirs 48 formed on the floor 32 of the housing base 20. Further, the foregoing principles of the invention can be adapted to non-pressure compensating emitter devices, for example by omitting the valve member 28 and cooperating discharge regulating groove 54 so that the upper wall of the flow channel 14 is defined by the inner overlying surface of the cap 22, with the discharge chamber 50 communicating directly with the outlet 16. Similarly, the principles of the present invention can readily be adapted for use with continuous tube type drip irrigation hoses such as by forming the channel pattern 26 in the opposed wall portions of the overlapping walls of such tubing, whereby the overlapping walls function to form the emitter housing. Accordingly, no limitation on the invention is intended by way of the foregoing description and accompanying drawings, except as set forth in the appended claims.

What is claimed is:

1. A drip irrigation emitter, comprising:

a housing having a water inlet adapted for connection to a water supply conduit, a water outlet, and channel means forming an elongated pressure reducing flow channel defined by vertically spaced upper and lower walls interconnected by laterally spaced sides extending between said water inlet and said water outlet;

said channel means including a plurality of flow diverting ribs projecting partially into the flow channel from opposite sides thereof and arranged in an alternating sequence along the channel length to cause water flowing through the flow channel to undergo repeated back-and-forth lateral directional changes between said sides;

said channel means further including a plurality of flow diverting weirs disposed along the channel length and projecting partially into the flow channel from at least one of said walls to cause water flowing through the flow channel to undergo repeated up-and-down directional changes between said walls.

2. The drip irrigation emitter of claim 1 wherein said flow diverting ribs extend from said sides generally to a longitudinal centerline of the flow channel.

3. The drip irrigation emitter of claim 2 wherein said flow diverting weirs extend from said at least one wall generally from about one-third to about one-half way into the flow channel.

4. The drip irrigation emitter of claim 1 wherein said flow diverting weirs extend from said lower wall generally from about one-third to about one-half way into the flow channel.

5. The drip irrigation emitter of claim 1 wherein said weirs extend laterally across the flow channel and are provided in a number generally corresponding with the number of said ribs.

6. The drip irrigation emitter of claim 1 wherein said weirs extend generally along a longitudinal centerline of the flow channel.

7. The drip irrigation emitter of claim 1 further including pressure compensation means for regulating water flow through said water outlet to a predetermined and substantially constant water flow rate over a range of water pressures at said water inlet.

8. The drip irrigation emitter of claim 1 wherein said housing comprises first and second housing components assembled to form a hollow housing interior, said water inlet being formed in said first housing component and said water outlet being formed in said second housing component, said laterally spaced sides and said lower wall of said channel means being formed in said second housing component within said housing interior and defining a channel pattern, and a resilient valve member overlying and engaging said channel pattern within said housing interior, said valve member defining said upper wall of said flow channel.

9. The drip irrigation emitter of claim 8 wherein said second housing component includes an upwardly open discharge regulating groove through which water flows from said channel means to said water outlet, said resilient valve member overlying and engaging said groove to form a pressure compensating means for regulating water flow from said channel pattern to said water outlet.

10. A drip irrigation emitter, comprising:

a housing having a water inlet adapted for connection to a water supply conduit, a water outlet, and channel means forming an elongated pressure reducing flow channel extending between said water inlet and said water outlet;

said channel means including first means for causing water flowing through the flow channel to undergo repeated back-and-forth directional changes generally within a first plane, and second means for causing water flowing through the flow channel to undergo repeated back-and-forth directional changes generally within a second plane oriented generally perpendicular to said first plane, said second means being disposed along the flow channel in interspersed relation to said first means.

11. A drip irrigation emitter, comprising:

a generally cup-shaped housing base including a floor surface and an upstanding peripheral outer wall, said floor surface having a water outlet formed therein, said floor surface further having an upwardly open channel pattern formed thereon;

a generally disk-shaped housing cap adapted for assembly with said housing base outer wall to define a hollow housing interior, said housing cap having a water inlet formed therein; and a resilient valve member disposed within the housing interior in a position to overlie said channel pattern, said valve member cooperating with said channel pattern to define an elongated pressure reducing flow channel with an upstream end in flow communication with said water inlet and a downstream end in flow communication with said water outlet;

said channel pattern including first means for causing water flowing through the flow channel to undergo repeated back-and-forth directional changes generally within a first plane, and second means for causing water flowing through the flow channel to undergo repeated back-and-forth directional changes generally within a second plane oriented generally perpendicular to said first plane, said second means being disposed along the flow channel in interspersed relation to said first means.

12. The drip irrigation emitter of claim 11 wherein said channel pattern includes a pair of spaced-apart sides upstanding from said floor surface of said housing base within the housing interior.

13. The drip irrigation emitter of claim 12 wherein said first means comprises a plurality of flow diverting ribs extending from said sides partially into the flow channel at opposite sides thereof and arranged in an alternating sequence to cause water flowing through the flow channel to undergo the direction changes generally within said first plane.

14. The drip irrigation emitter of claim 13 wherein said second means comprises a plurality of flow diverting weirs extending from said floor surface partially into the flow channel at positions disposed along the channel length to cause water flowing through the flow channel to undergo the direction changes generally within said second plane.

15. The drip irrigation emitter of claim 14 wherein said flow diverting ribs extend from said sides generally to a longitudinal centerline of the flow channel.

16. The drip irrigation emitter of claim 15 wherein said flow diverting weirs extend from said floor surface generally about one-third to about one-half way into the flow channel.

17. The drip irrigation emitter of claim 11 further including pressure compensation means for regulating water flow through said outlet to a predetermined and substantially constant water flow rate over a range of water pressures at said inlet.

18. The drip irrigation emitter of claim 11 wherein said housing cap includes a barbed stem in flow communication with said water inlet and adapted for connection to a water supply conduit.

19. The drip irrigation emitter of claim 11 wherein said housing base includes an outlet stem in flow communication with said water outlet.

20. The drip irrigation emitter of claim 1 wherein said flow diverting weirs are disposed along the channel length in interspersed relation to said flow diverting ribs.

* * * * *